United States Patent Office 2,900,304
Patented Aug. 18, 1959

2,900,304

GRISEOFULVIN USES AND COMPOSITIONS

Alfred Ronald Martin, Manchester, England, assignor to Imperial Chemical Industries Limited, London, England, a corporation of Great Britain No Drawing. Application September 3, 1957
Serial No. 681,472

Claims priority, application Great Britain September 21, 1956

14 Claims. (Cl. 167—65)

This invention relates to fungicidal compositions and more particularly it relates to fungicidal compositions comprising griseofulvin for the treatment of fungus diseases of man and animals.

Griseofulvin is a known antibiotic and it is known to be useful in the treatment of certain fungus diseases of plants. It has not hitherto been used in the treatment of fungus diseases of man and animals.

Furthermore many important fungus diseases of man and animals are skin diseases, for example ringworm and athlete's foot, and these are commonly treated by topical application of medicaments in the form of ointments and the like. Our co-pending U.S. application Serial No. 681,473, of even date herewith, relates to griseofulvin-containing compositions suitable for such topical application. We have also found however that fungus diseases of man and animals may be treated by oral or parenteral administration of suitable compositions comprising griseofulvin. This is particularly surprising in respect of those fungus diseases which are skin diseases.

According to this invention therefore we provide new compositions suitable for the treatment of fungus diseases of man and animals which comprise griseofulvin as active fungicidal ingredient and pharmaceutical excipients known for the production of formulations suitable for oral or parenteral administration.

The griseofulvin is preferably present in the compositions in such proportion by weight that the proportion by weight of griseofulvin in the formulation to be administered lies between 0.1% and 50%.

Compositions suitable for oral administration are the known pharmaceutical forms for such administration, namely for example tablets, pills, syrups, and aqueous or oily suspensions and the excipients used in the production of these formulations are the excipients well known to the pharmacist's art, as are also the means of formulation.

Suitable compositions may be tablets wherein the griseofulvin is mixed with an inert diluent for example calcium carbonate or lactose in the presence of disintegrating agents for example maize starch and lubricating agents for example magnesium stearate. Aqueous suspensions for oral use may contain griseofulvin in aqueous media in the presence of a suitable non-toxic suspending agent for example sodium carboxymethylcellulose and suitable dispersing agents. Suitable dispersing agents may be for example lecithin or condensation products of ethylene oxide with fatty acids for example polyoxyethylene stearate or with fatty alcohols for example heptadeca-ethyleneoxycetanol or with partial esters derived from the fatty acids and hexitols for example polyoxyethylene sorbitol hexa-oleate, or with partial esters derived from the fatty acids and hexitol anhydrides, for example hexitans derived from sorbitol, for example polyoxyethylene sorbitan mono-oleate. Oily suspensions for oral use may be formulated in a suitable vegetable oil for example arachis oil which may contain suitable sweetening agents and preservatives.

For the treatment of animals especially, by oral administration, the griseofulvin may first be incorporated into food premixes and the said premixes then used for incorporation into animal foodstuffs. The said food premixes may comprises griseofulvin in admixture with a diluent or carrier for example talc or lactose and/or other suitable non-toxic and orally-acceptable ingredients.

Compositions suitable for parenteral administration are the known pharmaceutical forms for such administration, for example sterile suspensions in aqueous and oily media. The excipients used in these formulations are the excipients well known to the pharmacist's art, as are also the means of formulation.

The sterile aqueous suspensions for parenteral administration may be formulated in the presence of parenterally-acceptable suspending agents and dispersing agents. Suitable suspending agents may be for example sodium carboxymethylcellulose, sodium alginate or polyvinyl pyrrolidone and suitable dispersing agents may be lecithin or the ethylene oxide condensation products described above for use as dispersing agents in the preparation of oral aqueous suspensions. Suitable injectable oily preparations may be prepared by dispersing griseofulvin in an oily medium for example a vegetable oil for example arachis oil which is known to be non-toxic and parenterally-acceptable.

The invention is illustrated but not limited by the following examples in which the parts are by weight.

Example 1

500 parts of griseofulvin are mixed with 70 parts of calcium carbonate and 200 parts of a 10% maize starch paste are added. The mixture is dried and is then passed through a 16-mesh screen. 5 parts of magnesium stearate are added and the granules are compressed to give tablets suitable for administration.

Example 2

A mixture of 1.5 parts of polyglyceryl ricinoleate and 0.1 part of sodium carboxymethylcellulose is stirred with 90 parts of distilled water. 10 parts of griseofulvin are then added and the mixture is ball-milled. The stable suspension thus obtained is sterilised and is then suitable for administration by injection.

Example 3

150 parts of griseofulvin in fine powder form are mixed with 500 parts of lactose and 100 parts of maize starch and the mixture is treated with sufficient 10% maize starch paste to give a granular mass. This mixture is passed through a 16-mesh sieve and then dried. 8 parts of magnesium stearate are incorporated in the dried product and the resulting granules are then compressed into tablets suitable for administration.

Example 4

A mixture is formulated from 2 parts of griseofulvin and 98 parts of talc and there is thus obtained a composition suitable for use as a premix for admixture with animal foodstuffs.

Example 5

A mixture is formulated from 5 parts of griseofulvin and 95 parts of lactose and there is thus obtained a composition suitable for use as a premix for admixture with animal foodstuffs.

Example 6

100 parts of griseofulvin in fine powder form is added to a finely ground mixture of 29 parts of icing sugar, 0.6 part of sodium saccharine and 0.05 part of propyl gallate and the mixture is stirred until uniform. The compound powder thus obtained is suspended in 870 parts of arachis oil according to the art, 0.35 part of fruit flavour is added and there is thus obtained an oily dispersion suitable for oral use.

*Example 7*

A mixture of 10 parts of griseofulvin and 90 parts of arachis oil is ball-milled until substantially all the particles are below 50 microns in diameter. The suspension is then sterilised and is then suitable for administration by injection.

*Example 8*

142 parts of griseofulvin, 0.5 part of heptadeca-ethyleneoxycetanol and 900 parts of water are ball-milled for one hour. 10 parts of medium viscosity sodium carboxymethylcellulose are then added and ball-milling is continued for a further 4 hours until the bulk or mass of the griseofulvin in suspension is 50–60 microns. There is thus obtained a suspension suitable for dilution for oral use for therapeutic purposes for example as a drench for animals.

*Example 9*

A solution is prepared by dissolving 1.5 parts of methyl p-hydroxybenzoate, 0.2 part of propyl p-hydroxybenzoate, 2.5 parts of refined soya bean lecithin and 8 parts of polyvinylpyrrolidone in 1000 parts of distilled water. The aqueous vehicle so obtained is sterilised by heating in an autoclave. To the sterile aqueous vehicle so obtained 158 parts of sterile micropulverised griseofulvin are added. The resulting mixture is ball-milled for 15 minutes and there is thus obtained a suspension suitable for parenteral administration for therapeutic purposes.

What I claim is:

1. The process for treating man and animals having an external fungus disease which comprises internally administering to said man and animals an effective amount of griseofulvin.

2. The process for treating man and animals having a fungus skin disease which comprises internally administering to said man and animals and effective amount of griseofulvin.

3. A solid anti-fungal composition in shaped dosage unit form for oral administration which comprises griseofulvin as the active anti-fungal ingredient and a solid, non-toxic, orally-ingestible pharmaceutical carrier, said composition containing at least about 0.1% by weight of griseofulvin.

4. Compositions as claimed in claim 3 wherein the griseofulvin is present in such proportion by weight that the proportion by weight of griseofulvin in the formulation to be administered lies between 0.1% and 50%.

5. A solid anti-fungal composition in shaped dosage unit form for oral administration which comprises griseofulvin as the active anti-fungal ingredient, a solid non-toxic orally-ingestible pharmaceutical carrier, a disintegrating agent and a lubricating agent, said composition containing at least about 0.1% by weight of griseofulvin.

6. A solid anti-fungal composition in tablet form for oral administration which comprises griseofulvin as the active anti-fungal ingredient; a solid non-toxic orally-ingestible pharmaceutical carrier selected from the group consisting of calcium carbonate and lactose; maize starch as a disintegrating agent and magnesium stearate as a lubricating agent, said composition containing at least about 0.1% by weight of griseofulvin.

7. An anti-fungal composition for internal administration comprising griseofulvin as the active anti-fungal ingredient and a non-toxic, orally-ingestible liquid carrier including both a dispersing agent and a flavoring agent, said composition containing at least about 0.1% by weight of griseofulvin.

8. An anti-fungal composition for internal administration comprising griseofulvin as the active anti-fungal ingredient, suspended in a non-toxic, orally ingestible vegetable oil, said composition containing at least about 0.1% by weight of griseofulvin.

9. The composition of claim 8 wherein said oil is arachis oil, said composition being sterile and pyrogen-free.

10. A composition comprising an animal feed having an effective amount of griseofulvin admixed therein.

11. An anti-fungal composition for use as a premix for admixture with an animal foodstuff, said composition comprising griseofulvin as the active anti-fungal ingredient and a solid, non-toxic, orally-ingestible pharmaceutical carrier selected from the group consisting of talc and lactose, said composition including at least about 0.1% by weight of griseofulvin.

12. A liquid anti-fungal composition for internal administration comprising griseofulvin as the active anti-fungal ingredient, suspended in an aqueous non-toxic, orally-ingestible medium including both a suspending agent selected from the group consisting of sodium alginate, polvinylpyrrolidone and sodium carboxymethylcellulose, and a dispersing agent selected from the group consisting of lecithin and ethylene oxide condensation products with a member of the group consisting of a fatty acid, a fatty alcohol, a partial ester derived from a fatty acid and a hexitol, and a partial ester derived from a fatty acid and a hexitol anhydride; said composition containing at least about 0.1% by weight of griseofulvin.

13. An injectable anti-fungal composition according to claim 12, same being sterile and pyrogen-free.

14. A sterile, pyrogen-free anti-fungal composition for administration by injection comprising griseofulvin, as the active anti-fungal ingredient, suspended in distilled water containing polyglyceryl ricinoleate and sodium carboxymethyl cellulose, said composition including at least about 0.1% by weight griseofulvin.

References Cited in the file of this patent

UNITED STATES PATENTS

| | | |
|---|---|---|
| 2,507,193 | Buckwalter | May 9, 1950 |
| 2,671,748 | Crooks | Mar. 9, 1954 |
| 2,843,527 | Rhodes | July 15, 1958 |

FOREIGN PATENTS

| | | |
|---|---|---|
| 714,189 | Great Britain | Aug. 25, 1954 |

OTHER REFERENCES

Constant: J. Invest. Dermatol., vol. 7, 1946, p. 337.

Brian: Nature, vol. 167, 1951, pp. 347–349.

Smith: Antibiotics and Chemotherapy, vol. 4, No. 9, Sept. 1954, pp. 962, 970.

Ashton: Chem. and Ind., Sept. 17, 1955, p. 1183.

Campbell: International Symposium on Crop Protection, Ghent, Belgium, May 8, 1956, pp. 519–524.

Campbell: Proc. First Interntional Conf. on Antibiotics in Agr., Oct. 19–21, 1955, pp. 194–195.